(12) United States Patent
Perrey et al.

(10) Patent No.: US 10,761,709 B2
(45) Date of Patent: Sep. 1, 2020

(54) COMPUTER SYSTEM AND METHOD FOR CHANGING DISPLAY OF COMPONENTS SHOWN ON A DISPLAY DEVICE

(71) Applicant: General Electric Company, Schenectady, NY (US)

(72) Inventors: Christian Fritz Perrey, Zipf (AT); Heinz Schmied, Zipf (AT)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 16/204,441

(22) Filed: Nov. 29, 2018

(65) Prior Publication Data

US 2020/0174648 A1 Jun. 4, 2020

(51) Int. Cl.
  *G06F 3/0484* (2013.01)
  *G01S 7/52* (2006.01)
  *G06F 3/0488* (2013.01)

(52) U.S. Cl.
  CPC ...... *G06F 3/04847* (2013.01); *G01S 7/52053* (2013.01); *G06F 3/04883* (2013.01); *G06F 2203/04808* (2013.01)

(58) Field of Classification Search
  CPC .............. G06F 3/04847; G06F 3/0488; G06F 2203/04808; G01S 7/52053
  See application file for complete search history.

(56) References Cited

U.S. PATENT DOCUMENTS

| | | | |
|---|---|---|---|
| 6,922,816 B1 * | 7/2005 | Amin ................... | G06F 3/04847 715/732 |
| 6,937,254 B2 * | 8/2005 | Nishiyama .......... | G06F 3/04855 345/619 |
| 7,222,308 B2 | 5/2007 | Sauermann et al. | |

(Continued)

FOREIGN PATENT DOCUMENTS

| | | | | |
|---|---|---|---|---|
| CN | 105653059 | | 12/2015 | |
| FR | 2861192 A1 * | | 4/2005 | .............. A61B 8/468 |

OTHER PUBLICATIONS

English translation of FR 2861192 A1. Originally published in French on Apr. 22, 2005. Translation retrieved from [ip.com] on [Jan. 29, 2020], 8 pages. (Year: 2005).*

(Continued)

*Primary Examiner* — Amy M Levy
(74) *Attorney, Agent, or Firm* — The Small Patent Law Group LLC; Dean D Small (57) ABSTRACT

A method includes displaying a slider control on one or more of a display device or a display screen of a touch-sensitive device with a computer system. The slider control changes a display value of one or more components shown on the display device responsive to movement of an indicator element in the slider control. A first user input is received on the touch-sensitive device of the computer system associated with movement of the indicator element in the slider control. The display value of the one or more components changes by a first amount based on a distance that the first user input moved the indicator in the slider control. A second user input (Continued)

is received on the touch-sensitive device and changes the display value of the one or more components by a micro-amount that is smaller than the first amount that the display value is changed.

20 Claims, 6 Drawing Sheets

(56) References Cited

U.S. PATENT DOCUMENTS

| | | | | |
|---|---|---|---|---|
| 2002/0063737 | A1* | 5/2002 | Feig | G06F 3/04847 |
| | | | | 715/786 |
| 2010/0231534 | A1* | 9/2010 | Chaudhri | G06F 3/0481 |
| | | | | 345/173 |
| 2011/0032192 | A1* | 2/2011 | Mills | G06F 3/04847 |
| | | | | 345/173 |
| 2013/0222340 | A1* | 8/2013 | Ito | G06F 3/044 |
| | | | | 345/174 |
| 2014/0282252 | A1 | 9/2014 | Edwards et al. | |
| 2015/0277718 | A1* | 10/2015 | Lauer | G06F 3/04855 |
| | | | | 715/780 |
| 2015/0373299 | A1* | 12/2015 | Kritt | G11B 27/105 |
| | | | | 386/344 |
| 2016/0077725 | A1* | 3/2016 | Maeda | G06F 3/04847 |
| | | | | 715/833 |
| 2016/0132138 | A1* | 5/2016 | Angermayer | G06F 3/03547 |
| | | | | 345/173 |
| 2016/0143608 | A1* | 5/2016 | Schmied | G16H 40/63 |
| | | | | 600/407 |
| 2017/0371486 | A1 | 12/2017 | Neiswander et al. | |
| 2018/0000453 | A1* | 1/2018 | Hunter | A61B 8/463 |
| 2018/0349005 | A1* | 12/2018 | Bhargava | G06F 3/04883 |

OTHER PUBLICATIONS

K.H. Tang, Y.H. Lee: Dynamic mouse speed scheme design based on trajectory analysis, EHAWC'07 Proceedings of the 2007 international conference on Ergonomics and health aspects of work with computers, 329-338. https://books.google.at/books?id=fhrRd6xnKsC&pg=PA329&lpg=PA329&dq=Dynamic+mouse+speed+scheme+design+based+on+trajectory.

* cited by examiner

COMPUTER SYSTEM AND METHOD FOR CHANGING DISPLAY OF COMPONENTS SHOWN ON A DISPLAY DEVICE

FIELD

The subject matter disclosed herein relates generally to computer systems.

BACKGROUND

Computer systems generate image data representative of imaged bodies. The imaged bodies may be displayed on a display device of the computer system. Some types of computer systems can generate multi-dimensional image data. For example, some ultrasound computer systems can generate both two-dimensional image slices and three (or four) dimensional images or videos for viewing by operators of the computer systems.

The images displayed by the display device may be manipulated by an operator in multiple ways to change display of one or more components of the images. The user may activate a user interface or an input device, such as an electronic mouse or a track ball, to manipulate the images. As one example, the user may activate the input device to move a cursor to a target location on the screen of the display device. The cursor is linked to the input motion by a predefined constant distance ratio of the computer system such that the cursor moves across the display device at a predefined speed. When the user moves a distance A, the cursor on the display device moves a distance B. However, this constant distance ratio is often not suitable for different applications and the operation becomes cumbersome. If the ratio A/B is too low, then the cursor moves erratically over the display device. If the ratio A/B is too high, the user has to roll the electronic mouse or track ball multiple times to reach the target on the screen.

As another example, the user may manipulate the images by activating a slider control on the display device to change the value of a parameter. For example, the slider control may be used to change the magnification of the image, to change the speed of rotation of a multi-dimensional image, to move to a different page of a document or file, to change a ratio between a magnification of a first image and a magnification of a second image, to change a position of a displayed object on the display device, to change the speed of movement of a cursor on the display device, or to change the scale of the slider control. Using the input device or an appendage of the user touching the display device, the user moves an indicator element along the slider control. However, the size of the display device is often limited and the user cannot accurately adjust the indicator element on the slider control with a finger. For example, minimal movement with the finger may result in a change of the value of the slider control that is greater than intended.

BRIEF DESCRIPTION

In one embodiment, a method includes displaying a slider control on a display device or a display screen of a touch-sensitive device with a computer system. The slider control is configured to change a display value of one or more components shown on the display device or the display screen responsive to movement of an indicator element in the slider control. The method includes receiving a first user input on the touch-sensitive device of the computer system associated with movement of the indicator element in the slider control, and changing the display value of the one or more components by a first amount based on a distance that the first user input moved the indicator in the slider control. A second user input is received on the touch-sensitive device and changes the display value of the one or more components by a micro-amount. The micro-amount that the display value is changed is smaller than the first amount that the display value is changed.

In another embodiment, a system includes one or more processors configured to display a slider control on a display device or a display screen of a touch-sensitive device with a computer system. The slider control is configured to change a display value of one or more components shown on the display device or the display screen responsive to movement of an indicator element in the slider control. The system includes a first user input associated with movement of the indicator element in the slider control. The one or more processors are configured to receive the first user input via the touch-sensitive device of the computer system. The display value of the one or more components is configured to change by a first amount based on a distance that the first user input moved the indicator element in the slider control. The system also includes a second user input. The one or more processors are configured to receive the second user input via the touch-sensitive device. The display value of the one or more components is configured to change by a micro-amount based on the second user input. The micro-amount that the display value is changed is smaller than the first amount that the display value is changed.

In one embodiment, a method includes displaying a slider control on a display device or a display screen of a touch-sensitive device with an ultrasound imaging system. The slider control is configured to change a display value of one or more components shown on the display device or the display screen of the touch-sensitive device responsive to movement of an indicator element in the slider control. The method includes receiving a first user input on the touch-sensitive device of the ultrasound imaging system associated with movement of the indicator element in the slider control, and changing the display value of the one or more components by a first amount based on a distance that the first user input moved the indicator in the slider control. A second user input is received on the touch-sensitive device and changes the display value of the one or more components by a micro-amount. The micro-amount that the display value is changed is smaller than the first amount that the display value is changed. The first user input is sliding a first finger along the touch-sensitive area, and the second user input is repeating tapping on the touch-sensitive area. Each tap changes the display value of the one or more components by a unit of a range of the display values.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

One or more embodiments of the inventive subject matter described herein provide computer systems and methods that display a user interface and a cursor on a display device. First and second user inputs associated with movement of the cursor on the display device are concurrently received by the computer system. In one embodiment, the first user input is received via an input device, and the second user input is received via touches of a touch-sensitive device of the computer system by an appendage of the user. In another embodiment, the first and second user inputs are concurrent touches of the touch-sensitive device by different appendages of the user (e.g., different fingers of one hand of the user). Display of the cursor is moved on the display device in a vector defined by the first and second user inputs. The first user input defines a direction in which the cursor is moved, and the second user input defines a speed at which the cursor is moved. As one example, the speed of the cursor increases responsive to the first touch by the first finger and the second touch by the second finger moving away from each other. As another example, the speed of the cursor decreases responsive to the first touch and the second touch moving toward each other.

One or more embodiments of the inventive subject matter described herein also provide computer systems and methods that display a user interface and a slider control on the display device of the computer system. The slider control changes a display value of components shown on the display device responsive to movement of an indicator element in the slider control. A first user input is received on the touch-sensitive device. The first user input is associated with movement of the indicator element in the slider control. The display value of the components is changed by a first amount based on a distance that the first user input moved the indicator element in the slider control. As one example, the first user input slides a first finger along the touch-sensitive device to move the indicator element. If the display value is changed too much or too little, a second user input is received on the touch-sensitive device.

The one or more embodiments may be used for moving display of a cursor on an ultrasound display or any display device. Optionally, the one or more embodiments may be used for moving display of a cursor of another display device or the display device of another computer system. For example, the systems and methods may be used for moving display of the cursor on an ultrasound display, for moving display of a cursor on another display of another computer system, for moving another feature or component (e.g., besides a cursor) on the display device of an ultrasound display, or for moving another feature or component (e.g., besides a cursor) on the display of another computer system. Additionally or alternatively, the systems and methods may also be used for moving something or changing the display on a mobile device, such as a mobile phone, a mobile smart phone, a tablet computer, a remotely controlled display, or any alternative device including a display device.

The display value is changed by a micro-amount based on the second user input. As one example, the second user input repeatedly taps on the touch-sensitive device, where each tap changes the display value by a unit that may be the smallest increment that the display value can be changed. Optionally, the second user input may change the display value by a unit that is greater than the smallest increment that the display value can be changed but that is smaller than the first amount the display value may be changed by the first user input. As another example, the second user input slides a finger along the touch-sensitive device while the first user input remains stationary. The micro-amount that the display value is changed is smaller than the first amount that the display value is changed by the first user input. In one embodiment, the display value may be changed by a positive micro-amount for each tap by the second user input on one side of the first user input, and the display value may be changed by a negative micro-amount for each tap by the second user input on an opposite side of the first user input. In another embodiment, the second user input changes the display value by the micro-amount based on separation distance between a location where the first user input is received on the touch-sensitive device and a location where the second user input is received on the touch sensitive device.

At least one technical effect of the subject matter described herein provides a computer with the ability to dynamically change the speed of movement of a cursor on the display device. The computer system is able to concurrently receive first and second user inputs that define a direction in which the cursor moves and the speed at which the cursor moves along the display device. Another technical effect of the subject matter described herein provides a computer system with the ability to change a display value by a first amount based on a first user input, and by a micro-amount, that is smaller than the first amount, based on a second user input. For example, the first user input may be able to change the display value by factors of 10, but the second user input may be able to change the display value by factors of 1. Changing the display value by the micro-amount increases the accuracy of the display value relative to a system that changes the display value by only a first user input.

Figure 1:
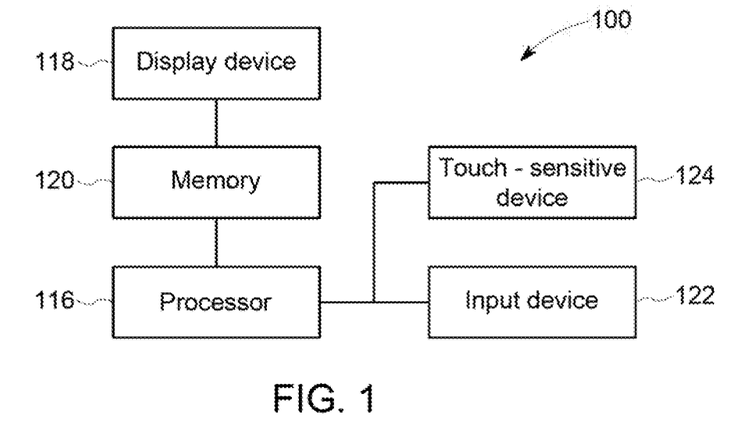
FIG. 1 is a schematic diagram of a computer system in accordance with one embodiment of the inventive subject matter described herein.

FIG. 1 is a schematic diagram of a computer system 100 in accordance with one embodiment of the inventive subject matter described herein. The computer system 100 may be an ultrasound imaging system in one or more embodiments, may be an alternative medical computer system, may be a recreational computer system such as a smartphone, a laptop or desktop computer, or the like, etc. According to an embodiment, the computer system 100 may be an ultrasound imaging system having a transmit beamformer and a transmitter that drive elements with a probe to emit pulsed ultrasonic signals into a body (not shown). The pulsed ultrasonic signals may be back-scattered from structures in the body, such as blood cells or muscular tissue, to produce echoes that return to the elements. The echoes are converted into electrical signals, or ultrasound data, by the elements and the electrical signals are received by a receiver. The electrical signals representing the received echoes are passed through a receive beamformer that outputs ultrasound data. The probe may contain electronic circuitry to do all or part of the transmit and/or the receive beamforming. For example, all or part of the transmit beamformer, the transmitter, the receiver and the receive beamformer may be situated within the probe. Scanning may include acquiring data through the process of transmitting and receiving ultrasonic signals. Data generated by the probe can include one or more datasets acquired with an ultrasound imaging system.

The computer system 100 includes one or more processors 116 that are in electronic communication with a display device 118. For example, the display device 118 may be a computer monitor display screen, a tablet screen, a smartphone screen, a camera screen, or the like, that may display images. In one or more embodiments, the display device 118 may also be referred to as a main display of the computer system 100. The display device 118 may also include a touch-sensitive area that extends along at least a portion of the display device 118 that responds to contact via a finger, plural fingers, and/or one or more styluses, or the like. For example, the touch-sensitive area may be a designated area of the display device 118, or may extend along substantially the entire area of the display device 118.

The computer system 100 also includes a touch-sensitive device 124 that is operably coupled with the processors 116. The touch-sensitive device 124 of the computer system 100 may include a touch pad having a display screen that displays one or more settings, images, icons, control commands, text displays, slider controls, or the like, to the user or operator of the computer system 100. For example, the touch-sensitive device 124 may include one or more display screens displaying different images, the touch pad or a touch-sensitive area that may extend along at least a portion of the display screen that may receive touches by an operator, one or more user icons that may be selected by the operator to change one or more settings of the computer system 100 or the display device 118, or the like.

In one or more embodiments, the touch-sensitive device 124 may be integrated with the display device 118. The computer system 100 may include the main display of the display device 118 that may include the touch-sensitive device that extends along at least a portion of the display device 118. For example, the computer system 100 may operate in different modes of operation that may allow the operator to manipulate the display device 118 like a user interface. For example, in a first mode of operation, the display device 118 may display an image, and in a different second mode of operation, the display device 118 may display the different settings, images, icons, control commands, text displays, or the like, to the operator. Optionally, the display device 118 may display both the image and the user interface together on a single screen of the display device 118 that the user may actuate or manipulate as the touch-sensitive device.

In one or more embodiments in which the touch-sensitive device 124 is integrated with the display device 118, the display device 118 may display the image and a user interface (e.g., a designated touch-sensitive area, one or more different icons, a slider control, or the like). In one or more alternative embodiments in which the touch-sensitive device 124 is separate from the display device 118, the touch-sensitive device 124 may include a touch pad having one or more display screens that display a user interface (e.g., the settings, icons, images, slider control, or the like) with the display screens. In one or more embodiments, the image may be displayed only on the touch pad of the touch-sensitive device 124 (e.g., on the display screen of the touch pad) or the image may be split between the display screen of the touch-sensitive device 124 and the display device 118. For example, the display screen of the touch pad (e.g., of the touch-sensitive device 124) may display a duplicate of the image shown on the main display device 118, a unique image relative to the image shown on the main display device 118, or the same or common image may extend between the display screen of the touch-sensitive device 124 and the main screen of the display device 118.

The processors 116 may process the data into images for display on the display device 118. The processors 116 may include one or more central processors (CPU) according to an embodiment. According to other embodiments, the processors 116 may include one or more other electronic components capable of carrying out processing functions, such as one or more digital signal processors, field-programmable gate arrays (FPGA), graphic boards, and/or integrated circuits. According to other embodiments, the processors 116 may include multiple electronic components capable of carrying out processing functions. For example, the processors 116 may include two or more electronic components selected from a list of electronic components including: one or more central processors, one or more digital signal processors, one or more field-programmable gate arrays, and/or one or more graphic boards. According to another embodiment, the processors 116 may also include a complex demodulator (not shown) that demodulates the radio frequency data and generates raw data. In another embodiment, the demodulation can be carried out earlier in the processing chain.

In one embodiment, the computer system 100 may be an ultrasound imaging system, and the touch-sensitive device 124 and/or the display device 118 may display an ultrasound image. The processors 116 may be adapted to perform one or more processing operations according to a plurality of selectable ultrasound modalities on the data. The data may be processed in real-time during a scanning session as the echo signals are received, such as by processing the data without any intentional delay or processing the data while additional data is being acquired during the same imaging session of the same person.

The data may be stored temporarily in a buffer (not shown) during a scanning session and processed in less than real-time in a live or off-line operation. Optionally, the data may be stored (e.g., temporarily or permanently) in a memory 120. Some embodiments of the inventive subject matter may include multiple processors (not shown) to handle the processing tasks that are handled by the processors 116 according to the exemplary embodiment described hereinabove. For example, a first processor may be utilized to demodulate and decimate the RF signal while a second processor may be used to further process the data prior to displaying an image. It should be appreciated that other embodiments may use a different arrangement of processors.

The memory 120 is included for storing processed volumes of acquired data. In one embodiment, the memory 120 is of sufficient capacity to store at least several seconds worth of volumes of data, such as ultrasound data. The volumes of data are stored in a manner to facilitate retrieval thereof according to its order or time of acquisition. The memory 120 may comprise any known data storage medium, such as one or more tangible and non-transitory computer-readable storage media (e.g., one or more computer hard drives, disk drives, universal serial bus drives, or the like).

An input device 122 is operably coupled with the one or more processors 116. The input device 122 may be used to control operation of the computer system 100, including, to control the input of person data, to change a scanning or display parameter, and the like. For example, the processors 116 can determine if an operator of the computer system 100 has provided input via the input device 122. In one or more embodiments, the input provided by the operator may be a request for one or more two-dimensional image slices of the body (not shown) to be shown on the display device 118, one or more three- or four-dimensional rendered images or videos to be shown on the display device 118, may request different settings of the display device 118 to be shown such as different evaluation screens or different views of the rendered images, may be a request to control movement of a cursor on the display device 118, or the like. The input device 122 may be a track ball, an electronic mouse, a keyboard, a stylus of the computer system 100, or the like. The illustrated embodiment of FIG. 1 includes a single input device, however, the computer system 100 may include any number of separate and distinct input devices that may be used to control operation of the computer system 100. Additionally or alternatively, the input device 122 may be integrated with the touch-sensitive device 124 as a single component of the computer system 100.

Figure 2:
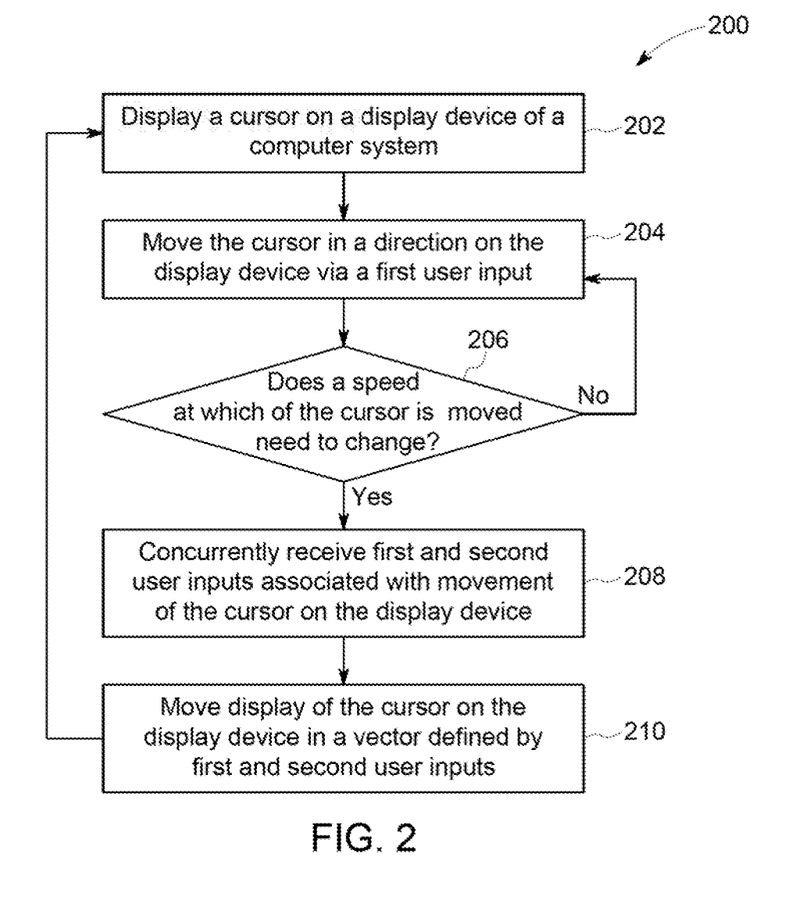
FIG. 2 illustrates a flowchart of one embodiment of a method for moving display of a cursor of a display device of a computer system.

FIG. 2 illustrates a flowchart of one embodiment of a method 200 for moving display of a cursor of the display device 118 of the computer system 100. Optionally, the method 200 may be used for moving display of the cursor of another display device or the display device of another computer system. For example, the method 200 may be used for moving display of the cursor on an ultrasound display, to move display of the cursor on another display of another computer system, to move another feature or component (e.g., besides a cursor) on the display device of an ultrasound display, or to move another feature or component (e.g., besides a cursor) on the display of another computer system. Additionally or alternatively, the method 200 may also be used to move something or change the display on a mobile device, such as a mobile smart phone, a tablet computer, a remotely controlled display, or any alternative device including a display device.

At 202, a cursor is displayed on the display device 118 of the computer system 100. At 204, the cursor is moved in a direction on the display device 118 via a first user input. In one embodiment, the first user input may be actuation or manipulation of the input device 122 such as a track ball, an electronic mouse, a keyboard, a stylus, or the like, of the computer system 100. Optionally, the cursor may be moved by actuation or manipulation of the touch-sensitive device 124, or actuation or manipulation of the display device 118 when the touch-sensitive device is integrated with the display device 118. For example, the first user input to control movement and a direction of movement of the cursor may be received via the input device 122 (e.g., the track ball, the electronic mouse, the stylus, a device other than the display device 118 or the touch-sensitive device 124, or the like), via the touch-sensitive device 124, and/or via the touch-sensitive device integrated with the display device 118. The cursor may be displayed on the display device 118, on the display screen of the touch-sensitive device 124, on a separate display device, or the like.

At 206, a decision is made if the speed of the movement of the cursor needs to be changed. In one embodiment, the operator may need to move the cursor across the majority of the display device 118, but the speed of the cursor may be preset by the computer system 100 to a speed that is too slow. For example, the operator may need to manipulate the input device 122 (e.g., the track ball) such that the operator turns the track ball multiple times in order for the cursor to reach the target location on the display device 118. The operator may need to move the cursor more quickly to the target location on the display device 118 than the preset speed of the movement of the cursor. In an alternative embodiment, the speed of the cursor may be preset by the computer system 100 to a speed that is too fast for the operation that the operator is conducting. For example, the operator may need to move the cursor only a minimal amount to move the cursor to the target location on the display device 118. However, minimal manipulation of the track ball may cause the cursor to move beyond the target location if the preset speed of the cursor is too fast.

The operator may want to increase or decrease the speed of the movement of the cursor on the display device 118. Optionally, the operator may not want to increase or decrease the speed of movement of the cursor. If the speed of the cursor does not need to be changed, then flow of the method proceeds to 204 and the operator continues to move the cursor in a direction on the display device 118. Alternatively, if the speed of the cursor does need to be changed (e.g., speed up, slow down), then flow of the method proceeds toward 208.

At 208, the one or more processors 116 concurrently receive first and second user inputs associated with the movement of the cursor on the display device 118. The first user input defines the direction in which the cursor is moved on the display device 118. The second user input defines the speed at which the cursor is moved on the display device 118. The first user input may be received by a first hand of the user manipulating the input device. Optionally, the first user input may be received by a first finger of the first hand manipulating the touch-sensitive device 124 and/or the display device 118. The second user input may be received by a second hand of the user manipulating the touch-sensitive device 124 and/or the display device 118 while the first hand of the user manipulates the input device. Optionally, the second user input may be received by a second finger of the first hand manipulating the touch-sensitive device 124 and/or the display device 118 while the first finger of the first hand manipulates the touch-sensitive device 124 or the display device 118. Optionally, the display screen of the touch-sensitive device 124 or the display device 118 may display a user interface (e.g., a slider control, one or more icons, or the like).

In one embodiment, the first user input may be manipulation of the input device 122 (e.g., the track ball) to move the cursor on the display device 118 and the second user input may be actuation of the touch-sensitive device 124 to change the speed of the cursor on the display device 118. In another embodiment, the first user input may be actuation of the touch-sensitive device 124 (e.g., the touch pad) to move the cursor on the display device 118 and the second user input may be actuation of the touch-sensitive device 124 to change the speed of the cursor on the display device 118. In another embodiment, the first and second user inputs may be actuation of the touch-sensitive device 124 and the cursor may be displayed on both the display device 118 and the display screen of the touch-sensitive device 124 (e.g., in parallel). In another embodiment, the first and second user inputs may be actuation of the touch-sensitive device 124 and the cursor may be displayed on the display screen of the touch-sensitive device 124. Optionally, the touch-sensitive device 124 may include separate areas of the display screen for input and for display.

Figure 3:
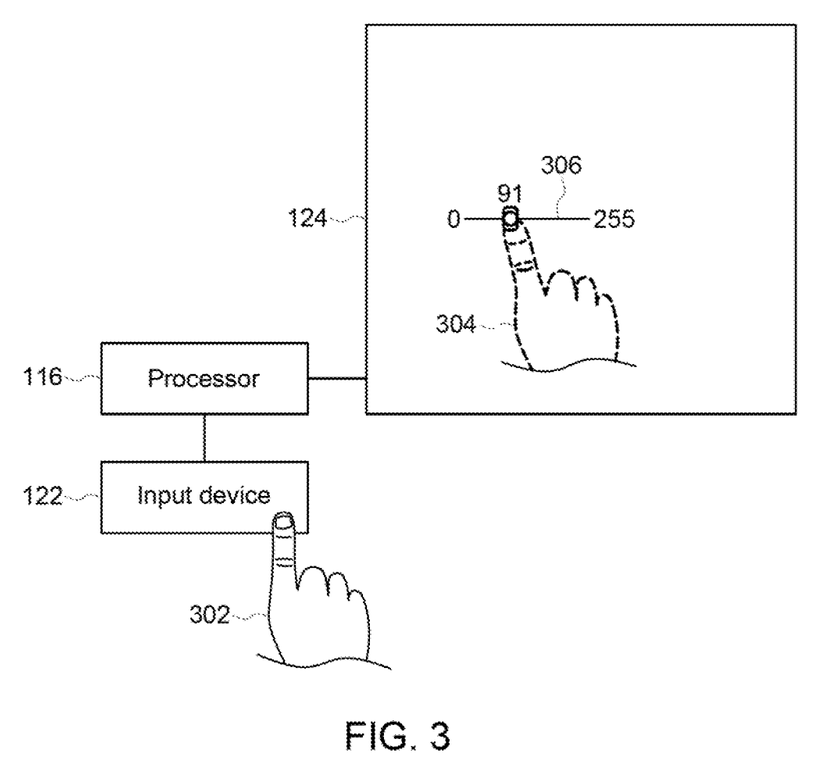
FIG. 3 illustrates two handed control of movement of a cursor on a display device of the computer system of FIG. 1.
Figure 4:
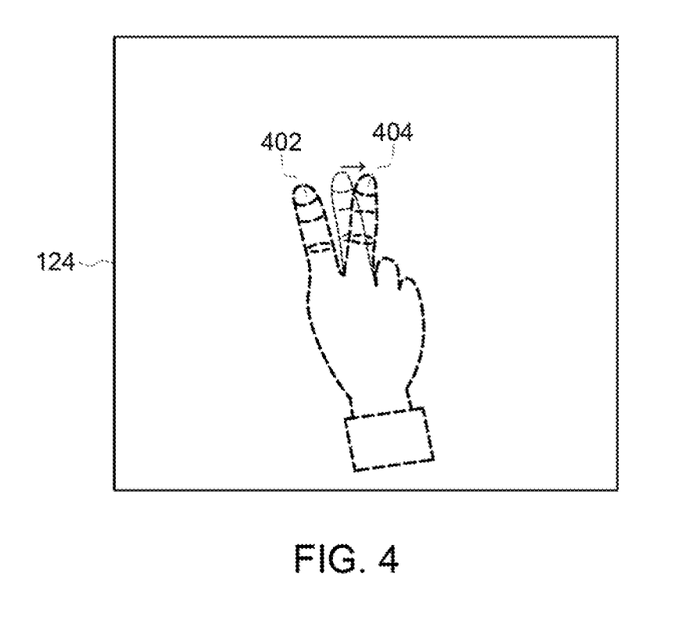
FIG. 4 illustrates single hand control of the movement of the cursor on the display device of the computer system of FIG. 1.

FIGS. 3 and 4 illustrate non-limiting different embodiments of controlling the movement of the cursor with the concurrent first and second user inputs. At 210, display of the cursor on the display device 118 (or on the display screen of the touch-sensitive device 124 or on an alternative display device) is moved in a vector defined by the first and second user inputs. The method may repeat until the desired movement of the cursor is achieved, while the user continues to operate the computer system 100, or the like.

FIG. 3 illustrates one embodiment of two-handed control of movement of the cursor on the display device 118 of the computer system 100. The operator may manipulate the input device 122 (e.g., the track ball) as the first user input and the touch-sensitive device 124 (e.g., the touch pad of the touch-sensitive device) as the second user input to change the speed of the movement of a cursor on the display device 118. Optionally, the operator may manipulate the input device 122 (e.g., the track ball) and the touch-sensitive device integrated with the display device 118 to control the movement of the cursor on the display device 118. The processors 116 receive actuation of the input device 122 as a first user input 302. The first user input 302 (e.g., a first appendage, such as a first hand, of the operator) manipulates the track ball, the electronic mouse, the keyboard, or the stylus of the computer system 100 to move the cursor on the display device 118 (or on the display screen of the touch-sensitive device) in a direction.

As previously set forth in the flowchart 200, if the speed of the cursor moving across the display device 118 needs to change (e.g., decrease in speed, increase in speed), a second user input 304 is concurrently received by the processors 116. In the illustrated embodiment of FIG. 3, the second user input 304 (e.g., a second appendage, such as a finger of a second hand of the operator) touches a slider control 306 (e.g., a user interface) of the touch-sensitive device 124. For example, the second user input 304 may be a finger of the operator or user of the computer system 100, and the touch of the finger to the touch-sensitive device 124 may be detected by the processors 116. Optionally, the second user input 304 may be a finger touching the touch-sensitive device integrated with the display device 118. The slider control 306 illustrates one embodiment of a user interface including a scale of values designating the speed of the cursor. For example, an indicator (not shown) may be displayed on the display device 118 or on the display screen of the touch-sensitive device 124 at a position along the length of the slider control 306. Moving the indicator along the slider control 306 (e.g., via the finger, a stylus, or the like) increases or decreases the speed of the cursor. The slider control 306 may be disposed at any position of the display device 118.

In order to control the movement of the cursor on the display device 118, the processors 116 concurrently receive the first and second user inputs 302, 304 from different appendages of the user or operator. As the first user input 302 (e.g., the first hand) manipulates the input device 122 (e.g., the track ball) to move the cursor in a direction, the second user input 304 (e.g., the second hand) concurrently touches the touch-sensitive device 124 to change the speed of the movement of the cursor on the display device 118. For example, by tapping, touching, or sliding the indicator (e.g., via a finger, a stylus, etc.) with the second user input 304 in a first direction on the slider control 306, the speed of the cursor increases as the cursor concurrently moves along the display device 118. Alternatively, by tapping, touching, or sliding the indicator (e.g., via a finger, stylus, etc.) with the second user input 304 in a different direction on the slider control 306, the speed of the cursor decreases as the cursor concurrently moves along the display device 118.

In one or more embodiments, the speed of the cursor may be changed plural times as the cursor moves on the display device 118. For example, the operator may move the cursor on the display device 118 towards a first target, and may increase the speed of the cursor by moving the indicator via the second user input 304 towards the increased values of the slider control 306. However, the speed of the cursor may be too fast. The operator may decrease the speed of the cursor by sliding the indicator via the second user input 304 towards the decreased values of the slider control 306.

In the illustrated embodiment, the slider control 306 is a substantially horizontal line representing a number scale. The speed of the cursor changes by moving the indicator (not shown) to different positions along the horizontal line, for example, by sliding, tapping, or touching the slider control 306. Optionally, the slider control 306 may be a substantially vertical line, may be circular, or may have any alternative orientation and/or configuration. In one or more embodiments, the touch-sensitive device 124 and the display device 118 may be void the slider control 306, and the speed of the cursor may be changed by detection of touches, taps, or the like, by the user at any location of the touch-sensitive device 124 or of the display device 118. Optionally, the speed of the cursor may be changed by varying magnitudes based on the number of different fingers of the second user input 304 (e.g., the second hand of the operator) that touch, tap, or slide along the touch-sensitive area of the display device 118. For example, sliding a first finger of the second user input 304 may change the speed by a first magnitude, and sliding the first finger and a second finger of the second user input 304 may change the speed by a greater, second magnitude. Optionally, the speed at which the second user input 304 is detected (e.g., increasing or decreasing speed of sliding the finger along the touch-sensitive device, the frequency of taps of the finger on the touch-sensitive device, or the like) may change the speed of the movement of the cursor by different magnitudes. Optionally, the speed of the cursor may be changed by any alternative method.

FIG. 4 illustrates one embodiment of single-hand control of the movement of the cursor on the display device 118 of the computer system 100 of FIG. 1. The operator may manipulate only the touch-sensitive device 124 (e.g., the touch pad) to move the cursor and to change the speed of the movement of a cursor on the display device 118. Optionally, the operator may manipulate only the display device 118 (e.g., when the touch-sensitive device is integrated with the display device 118) to control the movement of the cursor on the display device 118. The processors 116 receive actuation of a first user input 302. The first user input 402 is a first finger of the user of the computer system 100. The first user input 402 is a first touch of the touch-sensitive device 124 to move the cursor on the display device 118 in a direction. For example, the first user input 402 (e.g., the first finger of the hand of the user) may touch the display screen of the touch pad of the touch-sensitive device 124 and slide the first finger across the display screen to move the cursor along the display device 118 (or to move the cursor along the display screen of the touch-sensitive device 124). Optionally, the first user input 402 may be a first touch of the display device 118. The cursor moves across the display device 118 in response to the first user input 402 touching the touch-sensitive device 124 or touching the display device 118. The first user input 402 may move the cursor in any two-dimensional direction along the display device 118 and/or along the display screen of the touch-sensitive device 124.

If the speed of the cursor moving across the display device 118 needs to change (e.g., increase or decrease), a second user input 404 is concurrently received by the processors 116. In the illustrated embodiment of FIG. 4, the second user input 404 is a second touch by a second finger of the hand of the user of the computer system 100. The processors 116 detect concurrent first and second touches (e.g., by the first finger and the second finger of the user) of the touch-sensitive device 124 to move the cursor and to change the speed at which the cursor is moved along the display device 118. Optionally, the processors 116 may detect concurrent first and second touches of the display device 118 to move the cursor and change the speed at which the cursor is moved.

In one embodiment, the user places both the first finger and second finger (e.g., the first and second user inputs 402, 404) on the touch-sensitive device 124 (or the touch-sensitive device of the display device 118) with a distance between the two fingers. The user slides the first and second fingers along the touch pad of the touch-sensitive device 124 substantially maintaining the distance between the two fingers. The cursor moves in the direction of movement designated by the first user input 402 and at a preset speed. If the speed of the cursor is too slow, then as the first and second fingers slide along the touch-sensitive device 124 the user moves the two fingers away from each other (e.g., further apart) and increases the distance between the two fingers. Moving the first and second fingers away from each other increases the distance between the two fingers and increases the speed of movement of the cursor. Additionally, increasing the speed of the movement of the cursor reduces a time to move the cursor from a first position to a second position. Alternatively, if the speed of the cursor is too slow, then as the first and second fingers slide along the touch-sensitive device 124, the user moves the two fingers towards each other (e.g., closer together) and decreases the distance between the two fingers. Moving the first and second fingers toward each other decreases the distance between the two fingers and decreases the speed of movement of the cursor. Additionally, decreasing the speed of the movement of the cursor increase a time to move the cursor from the first position to the second position. Increasing or decreasing the distance between the first and second fingers may be repeated plural times until the desired speed of the cursor is achieved.

In another embodiment, the first finger (e.g., the first user input 402) touches the touch-sensitive device 124 and slides the finger along the touch-sensitive device to move the cursor. If the speed of the cursor is too slow, then the user places the second finger (e.g., the second user input 404) proximate to the first finger on the touch-sensitive device 124 and moves the second finger away from the first finger by sliding the second finger along the surface of the touch-sensitive device 124. In one embodiment, the second user input 404 may slide along the touch-sensitive device 124 while the first user input 402 remains substantially stationary. Optionally, the first and second user inputs 402, 404 may slide in directions away from each other to increase the distance between the first and second user inputs 402, 404. Optionally, the first and second touches may be detected by the processors 116 on the display device 118.

Increasing a distance or a size of a space between the first and second fingers increases the speed or velocity of movement of the cursor. Alternatively, if the speed of the cursor is too fast, the user places the second finger (e.g., the second user input 404) distal or apart from the first finger on the touch-sensitive device 124 and moves the second finger closer to the first finger by sliding the second finger along the touch-sensitive device 124. Decreasing the distance or the size of the space between the first and second fingers decreases the speed of movement of the cursor. The user continues to move the cursor in the direction via the first user input 402 after the speed of the movement of the cursor changes. Optionally, the second finger (e.g., the second user input 404) may tap or touch the touch-sensitive device 124 at locations that are closer to or further away from the first finger (e.g., the first user input 402) to increase or decrease the speed of the cursor. Optionally, different concurrent touches of the touch-sensitive device 124 or the display device 118 by the first and second user inputs may change the speed of the cursor by any alternative method.

In one or more embodiments, the first and second user inputs 402, 404 may be manipulated in different methods to move the cursor on the display device 118 and to control the speed of the movement of the cursor. For example, the first and second user inputs 402, 404 (e.g., the first and second fingers of the hand of the user) may tap or touch the touch-sensitive device 124 or the display device 118 integrated with the touch-sensitive device at different frequencies, at locations having varying distances between the first and second user inputs 402, 404, or the like. Optionally, the first user input 402 may slide in a first direction from a first location to a second location on the touch pad of the touch-sensitive device 124 to move the cursor, and the second user input 404 may slide in a different direction relative to the first direction on the touch pad of the touch-sensitive device 124 to change the speed of the cursor (e.g., up and down, in a circular clock-wise or counter clock-wise direction, or the like). Optionally, three or more other fingers of the user may change the movement of the cursor on the display device 118 or on the display screen of the touch-sensitive device 124.

In one or more embodiments, the memory 120 may store data that may be used to dynamically change the speed of the cursor based on a mode of operation of the computer system 100. In one example, the user may work in an archive (e.g., stored memory data) and may need to select plural different icons spread across the touch-sensitive device 124 or the display device 118. If the cursor speed is too slow, the user may have to move the input device 122 several times to get from one target to a second target on the display device 118. The user may want to increase the speed of the movement of the cursor to reduce the number of movements of the input device 122. The mode of operation of the computer system 100 (e.g., opening an image from the memory 120, starting a measurement, or the like) may be used as prior knowledge or prior data information for the expected cursor speed. For example, the memory 120 may store tailored cursor speeds based on the mode of operation of the computer system 100. The speed of the movement of the cursor may be tailored for plural different modes of operation, and the processors 116 may dynamically and automatically change the speed of the movement of the cursor based on the mode of operation selected by the user.

In another embodiment, the user may work in a mode of operation to perform a manual measurement (e.g., manually measure a feature of an ultrasound image displayed on the display device 118 in an ultrasound imaging system). If the cursor speed is too fast, the user may not be able to reach the target location (e.g., the cursor may move past the target location with minimal movement of the input device 122). The processors 116 may dynamically change the speed of the movement of the cursor based on the mode of operation of the computer system 100 (e.g., taking manual measurements).

In another embodiment, the tailored speed of the movement of the cursor for the plural modes of operation may be learned by the processors 116. During a learning phase of the processors 116, the behavior by the user (e.g., increasing the speed of the cursor, decreasing the speed of the cursor, etc.) during the plural modes of operation may be analyzed by the processors 116. If the motion pattern by the user indicates that the speed of the cursor is too slow or too fast, the speed of the cursor may be dynamically and automatically changed in the respective mode of the operation for a later use. Dynamically changing the speed of the cursor improves the increase of accuracy of the cursor control relative to the speed of the cursor remaining unchanged or being changed manually.

Figure 5:
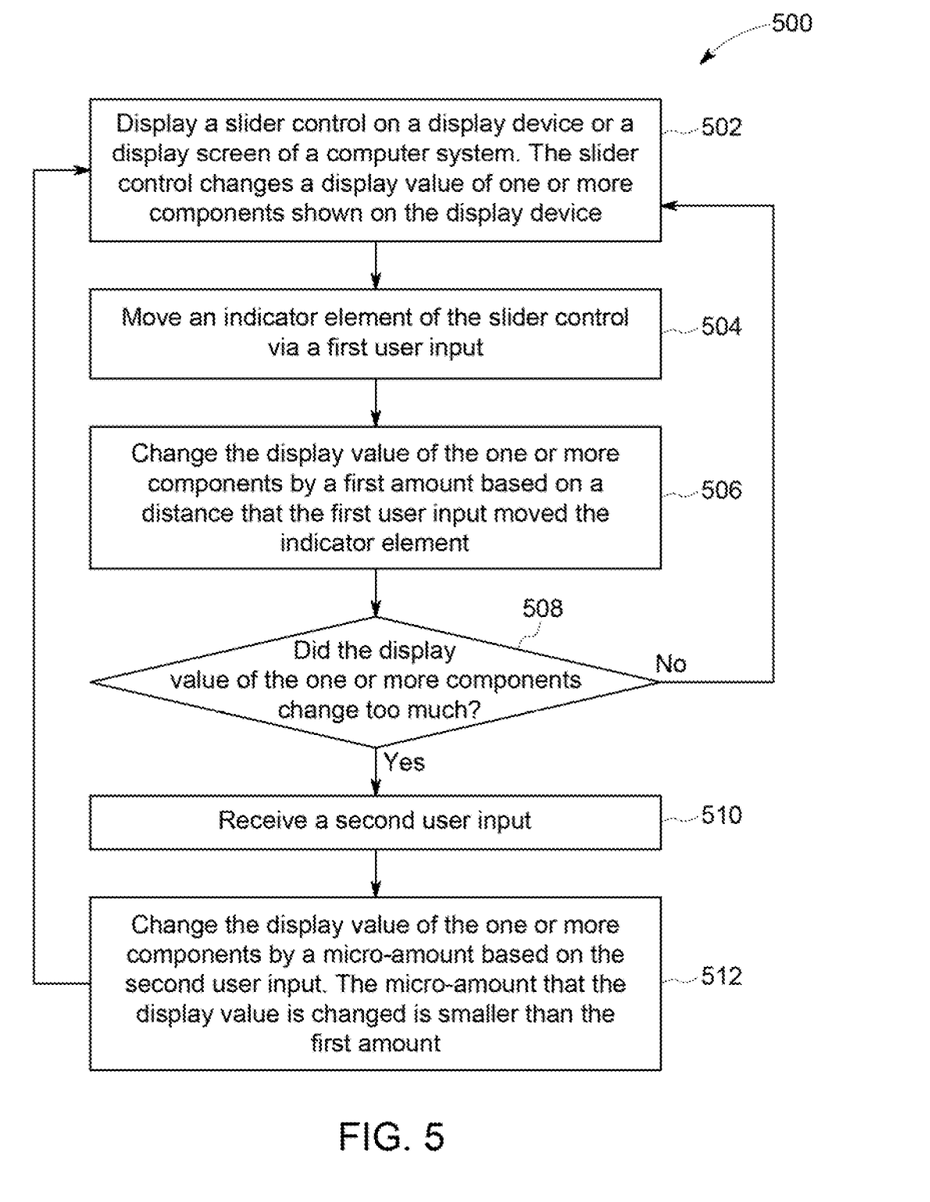
FIG. 5 illustrates a flowchart of one embodiment of a method for changing a display value by a first amount and by a micro-amount based on first and second user inputs.

In one or more embodiments, the first and second user inputs that are concurrently received by the processors 116 may change one or more other components of the computer system 100. For example, FIG. 5 illustrates a flowchart of one embodiment of a method 500 for changing a display value by a first amount and by a micro-amount based on first and second user inputs.

At 502, the slider control (e.g., the user interface, the slider control 306 of FIG. 3) is displayed on the display screen of the touch-sensitive device 124. Optionally, the slider control 306 may be displayed on the display device 118 of the computer system 100. At 504, an indicator element of the slider control is moved via a first user input. The slider control may be displayed on the touch-sensitive device 124 of an ultrasound imaging system, on the display device 118 of an ultrasound image, on a display device of another computer system, on the display device of a mobile device such as a mobile phone, a tablet computer, or the like, or on any alternative device including a display device or a display screen. In one or more embodiments, the first user input may be a first finger of a first hand of the user touching the touch-sensitive device 124, a first finger touching the display device 118, a stylus touching the indicator element on the touch-sensitive device 124 or the display device 118, activation and/or manipulation of the input device (e.g., the input device 122), or the like.

The slider control changes a display value of one or more components shown on the display device 118 responsive to the movement of the slider control by the first user input. Optionally, the slider control may change a display value of components shown on the display screen of the touch-sensitive device 124. The one or more components or characteristics may be a magnification of an image, may be a speed of rotation of a three-dimensional image, may be a different pages of a document or file illustrated on the display device 118, may be a ratio between a magnification of a first image and a magnification of a second image on the display device 118, may be a ratio of an image that is split between being display on the display device 118 and being displayed on the display screen of the touch-sensitive device 124, may be a position of a displayed object on the display device 118, may be the speed of movement of a cursor on the display device 118, may be a size of the scale of the slider control, or the like.

At 506, the display value of the one or more components is changed by a first amount based on a distance that the first user input moved the indicator element. For example, the display value may be a numerical value on the slider control that has a lower value and an upper value. The upper and lower values may be predetermined or preset by the computer system 100. As the first user input moves the indicator element towards the upper value of the slider control, the display value increases. Alternatively, as the first user moves the indicator element towards the lower value of the slider control, the display value decreases.

The display value dynamically changes as the first user input manipulates the indicator element. For example, the slider control may be changing the display value of the magnification of the image illustrated on the display device 118. As the indicator element is moved toward the upper value of the slider scale, the magnification of the image may dynamically increase, and the image may be zoomed in to a size corresponding to the positioning of the indicator element. Alternatively, as the indicator element is moved toward the lower value of the slider scale, the magnification of the image may dynamically decrease, and the image may be zoomed out to a different size corresponding to the positioning of the indicator element. The numeric value identified by the display value continuously changes responsive to the indicator element moving relative to the slider control.

In one or more embodiments, the display value may be an image, such as a conical shape. As the indicator element is moved toward the upper value of the slider control, a volume of the conical shape may dynamically fill to indicate that the display value is increasing. Alternatively, as the indicator element is moved toward the lower value of the slider control, the volume of the conical shape may dynamically empty to indicate that the display value is decreasing. Optionally, the display value, and the increasing or decreasing value of the display value, may be illustrated by one or more alternative methods.

At 508, a decision is made if the display value or characteristic of the one or more components has changed too much. For example, moving the indicator element toward the upper value by a single unit may change the display value by 20× the single unit, but the display value may need to reach only a value of 5× the single unit. The unit may be the smallest increment or decrement that the display value can be changed by the computer system 100. For example, the unit may be a single numeric digit, may be a fraction of a number, or the like. Optionally, the second user input may change the display value by a unit that is greater than the smallest increment that the display value can be changed but that is smaller than the first amount the display value may be changed by the first user input. In another embodiment, the user may need to change the display value by 5 units, but the size of the finger of the user changes the display value by 20 units. Alternatively, the display value may change too much. For example, the user may need to change the display value by 100 units, but the scale of the slider control can only be changed by 50 units. If the display value has been changed too much or too little by the movement of the indicator element via the first user input, then flow of the method proceeds toward 510. If the display value has not been changed by too much or too little, then flow of the method returns to 502 and the method continues to repeat as the user operates the computer system 100.

At 510, the processors 116 receive a second user input. The second user input may be received on the touch-sensitive device 124, on the touch-sensitive area of the display device 118, via the input device 122, or the like. The second user input may be a second finger of one hand of the operator, may be a stylus touching the touch-sensitive device 124 or the display device 118, activation and/or manipulation of one or more input devices 122, or the like. The second user input may be one or more repeated taps on the touch pad of the touch-sensitive device, may be a sliding motion on the touch-sensitive device 124 in a direction relative to the first user input (e.g., towards or away from the first user input, linear or angular relative to the first user input, in a circular motion relative to a linear motion of the first user input, or the like), may be tapping by plural different fingers of one hand of the user, or the like. At 512, the display value of the slider control is changed by a micro-amount based on the second user input. The display value is changed by the micro-amount that is smaller than the first amount that the display value is changed (e.g., smaller than the first amount changed by on the first user input).

In one or more embodiments, the first user input (e.g., moving the indicator element) designates a rate of change of the one or more components, and the second user input modifies the rate of change. For example, the second user input may accelerate or decelerate the movement of one or more components and/or parameters of the computer system 100. The second user input may accelerate or decelerate the rate of change of the one or more components and/or parameters of the computer system 100 based on a frequency of the repeated tapping by the second user input.

FIGS. 6 through 10 illustrate different embodiments of changing the display value of the one or more components by a first amount based on the first user input, and by a micro-amount (e.g., that is smaller than the first amount) based on the second user input.

Figure 6:
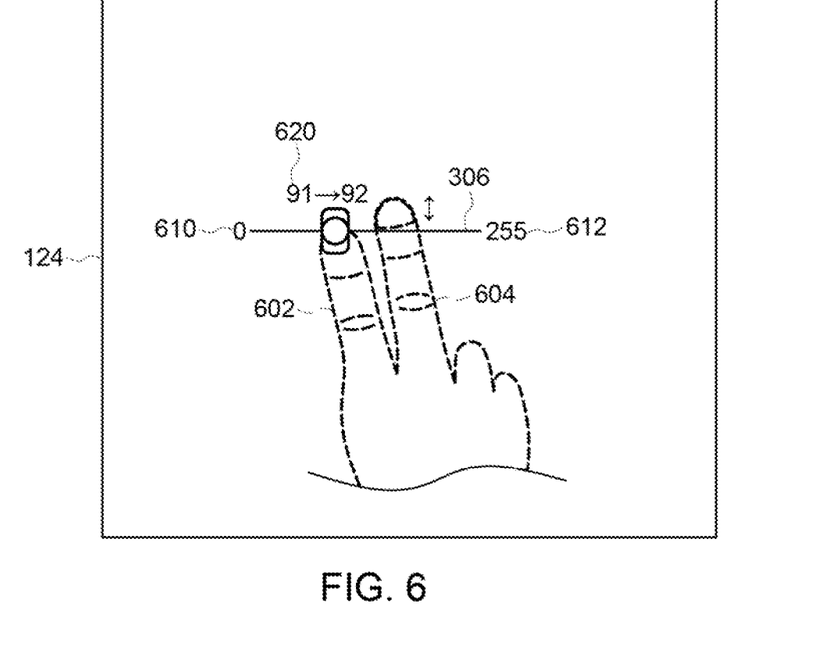
FIG. 6 illustrates first and second user inputs changing a display value by a positive amount.

FIG. 6 illustrates first and second user inputs 602, 604 changing a display value 620 by a positive amount. In the illustrated embodiment, the first user input 602 is a first touch by a first finger of one hand of the user, and the second user input 604 is a second touch by a second finger of the hand of the user on the touch-sensitive device 124. Optionally, the first and/or second user inputs 602, 604 may be touching of the display device 118 by the first and second fingers, by a stylus, may be activation and/or manipulation of the input device 122, or any combination therein.

The first user input 602 is associated with movement of the indicator element in the slider control 306. For example, the first finger touches the touch-sensitive device 124 and moves the indicator element along the slider control 306 by sliding the first finger along the slider control 306. The slider control 306 has a range from a lower value 610 to an upper value 612. The first user input 602 changes a display value 620 of the one or more components and/or parameters of the computer system 100 by a first amount based on the distance that the first user input moved the indicator element in the slider control 306. For example, the first user input 602 moves the indicator element to a location having a corresponding display value 620 of the numeric value 91. The user may need to change the display value 620 from the value 91 to the value 92, but movement of the first user input 602 may prohibit the display value 620 reaching the value 92. For example, the first finger of the user may be a size that prohibits the first user input from reaching the target display value of the value 92 (e.g., the first finger may be too large), the scale of the slider control 306 may be preset such that movement by the first user input 602 changes the display value by factors of 10 (e.g. the first user input 602 may only achieve meeting the display values 81, 91, 101, or the like), the first amount may change the display value 620 more or less than intended, or the like.

The second user input 604 is received by the processors 116 to meet the display value 620 target of the value 92. In the illustrated embodiment of FIG. 6, the second user input 604 (e.g., the second finger) taps on the touch-sensitive device 124 as the first user input 602 (e.g., the first finger) remains touching the touch-sensitive device 124. The second user input 604 changes the display value 620 of the one or more components by a unit of a range of the display values 620. For example, the second user input 604 changes the display value 620 by a micro-amount (e.g., 1 unit) that is smaller than the first amount that the display value 620 is changed based on the first user input 602 (e.g., 10 units). In one embodiment, the unit is the smallest increment or decrement that the display value 620 can be increased or decreased, respectively, by the computer system 100. For example, the unit may be a single integer, may be a fraction of an integer, or the like. Optionally, the second user input 604 may slide in any direction to change the display value 620 by the micro-amount while the first user input 602 remains stationary. For example, the second user input 604 may slide in a direction substantially linear to the slider control 306, substantially perpendicular to the slider control 306, in any angular direction relative to the slider control 306, or the like, to change the display value 620 by the micro-amount.

Tapping the second finger (e.g., the second user input 604) on one side of the first user input 602 while the first user input 602 remains stationary changes the display value 620 by a positive amount. For example, a single tap by the second user input 604 on one side (e.g., the right side, or the side proximate the upper value 612 of the slider control 306) of the first user input 602 increases the display value 620 from the value 91 to the value 92. Optionally, plural taps may change the display value 620 by the number of taps. For example, five taps by the second user input 604 may increase the display value 620 from the value 91 to the value 96. Optionally, the frequency of the number of taps may increase the display value 620 by a different number of units, the display value 620 may increase by a different micro-amount based on a length of time in which the second user input touches the touch-sensitive device, sliding the second user input 604 in a direction relative to the first user input 602 may increase the display value 620 by a different micro-amount, or the like.

Figure 7:
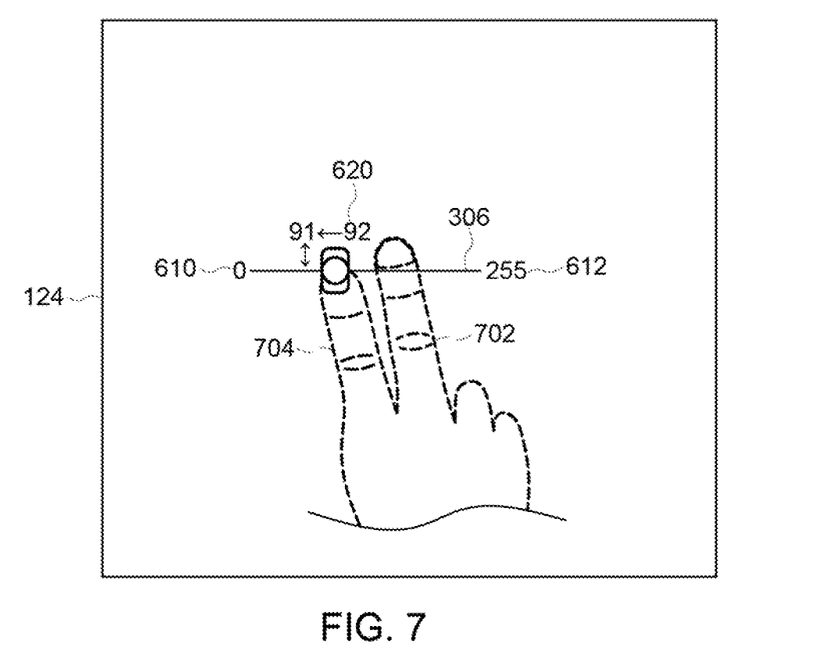
FIG. 7 illustrates first and second user inputs changing a display value by a negative amount.

Optionally, the user may need to decrease the display value 620 by a micro-amount. FIG. 7 illustrates first and second user inputs 702, 704 changing a display value 620 by a negative amount. The first user input 702 touches the touch-sensitive device 124 to move the indicator element in the slider control 306 displayed on the display screen of the touch-sensitive device 124. Optionally, the first user input 702 may include touching the display device 118. For example, the first user input 702 moves the indicator element to a location having a corresponding display value 620 of the numeric value 92. The user may need to change the display value 620 from the value 92 to the value 91, but movement of the first user input 702 may prohibit the display value 620 reaching the value 91.

The second user input 704 is received by the processors 116 to meet the display value 620 target of the value 91. In the illustrated embodiment of FIG. 7, the second user input 704 taps on the touch-sensitive device 124. Optionally, the second user input 704 may include tapping the display device 118. Each tap changes the display value 620 of the one or more components by a unit of a range of the display values 620. For example, the second user input 704 changes the display value 620 by a micro-amount that is smaller than the first amount that the display value 620 is changed based on the first user input 702. Tapping the second finger (e.g., the second user input 704) on an opposite side of the first user input 702 while the first use input 702 remains stationary changes the display value 620 by a negative amount. For example, a single tap by the second user input 704 on one side (e.g., the left side, or the side proximate the lower value 610 of the slider control 306) of the first user input 702 decreases the display value 620 from the value 92 to the value 91.

In one embodiment, the first user input may be an index finger of the user and the second user input may be a middle finger of the user. The first user input (e.g., the index finger) may move the indicator element by the first amount. To change the display value 620 by a negative amount, the second user input (e.g., the middle finger or a finger other than the index finger) may touch the touch-sensitive device 124 to maintain the position of the indicator element in the slider control 306 and the first user input (e.g., the index finger) may tap on the touch-sensitive device 124. For example, the second user input may now be associated with changing the display value by the first amount, and the first user input may now be associated with changing the display value 620 by the micro-amount.

Figure 8:
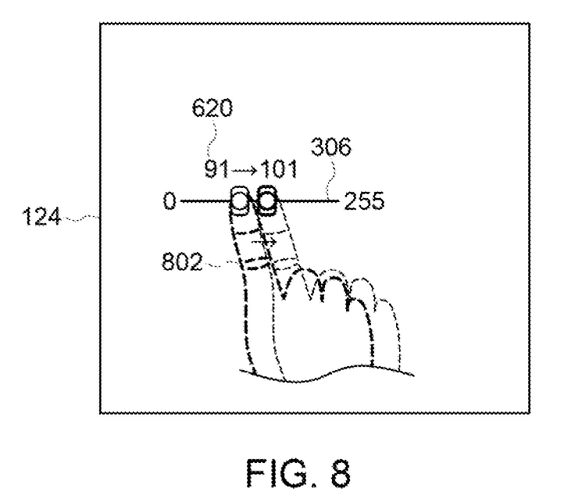
FIG. 8 illustrates a first user input sliding a first finger along a touch-sensitive device.

In one or more embodiments, the first and/or second user inputs may be used to change the scale of the slider control 306. For example, FIG. 8 illustrates a first user input 802 sliding a first finger along the touch-sensitive device 124 (e.g., along the display screen of the touch pad, along a different portion of the touch-sensitive device that does not include a display screen, or the like) to move the indicator element in the slider control 306 to continuously change the display value 620. The first user input 802 changes the display value 620 by a first amount based on the distance that the first user input 802 moves the indicator element. In the illustrated embodiment, the first user input 802 moves a first distance and changes the display value 620 from the value 91 to the value 101.

Figure 9:
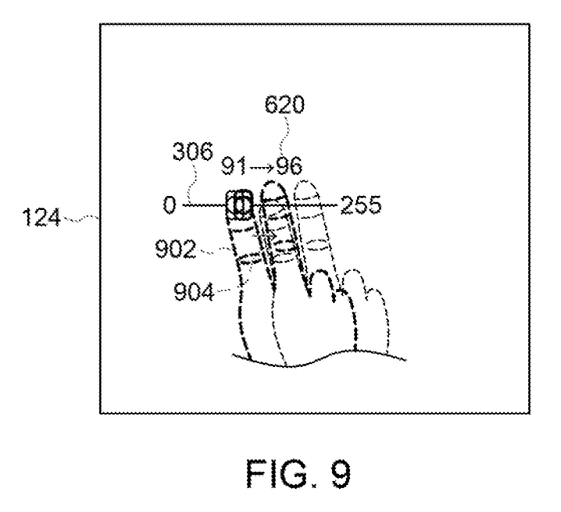
FIG. 9 illustrates first and second user inputs sliding a first and second finger along a touch-sensitive device.

FIG. 9 illustrates first and second user inputs 902, 904 sliding a first and second finger along the touch-sensitive device 124 to continuously change the display value 620. Optionally, the first and second user inputs 902, 904 may be received by the display device 118. The first and second user inputs 902, 904 concurrently touch the touch-sensitive device 124 and slide along the slider control 306 (e.g., the user interface displayed on the display screen of the touch-sensitive device 124). For example, the processors 116 detect concurrent touches by the first and second user inputs 902, 904 (e.g., by the first and second fingers). Moving both the first and second user inputs 902, 904 the same first distance (e.g., of FIG. 8) changes the display value from the value 91 to the value 96. For example, the first user input 802 of FIG. 8 may move the indicator element a distance of 10 mm to change the display value by 10 units, but the first and second user inputs 902, 904 of FIG. 9 may move the indicator element the same or substantially the same distance of 10 mm to change the display value by 5 units.

The first user input changes the display value by the first amount (e.g., 10 units) and the second user input changes the display value by the micro-amount (e.g., 5 units) that is less than the first amount. Optionally, the second user input 904 may include additional concurrent touches on the touch-sensitive device 124 and/or the display device 118 by one or more additional fingers concurrently touching the touch-sensitive device or the display device. For example, a third and fourth finger may concurrently touch the touch-sensitive device 124 to change the display value 620. Each touch of the one or more additional fingers concurrently touching the touch-sensitive device may change the display value 620. For example, a third user input (e.g., a third finger) may change the display value by a second micro-amount that is less than the micro-amount changed by the second user input. Optionally, the display value 620 may change based on a substantially constant or varying space or separation distance between a location of the first user input 902 on the touch-sensitive device and a location of the second user input 904 on the touch-sensitive device.

Figure 10:
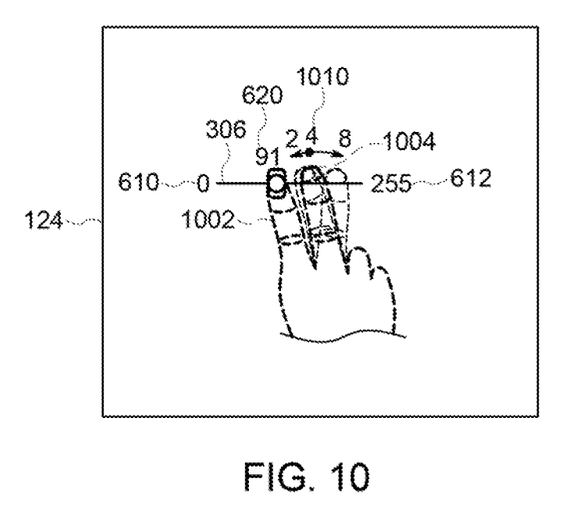
FIG. 10 illustrates a second user input changing a display value by an incremental amount based on separation distance between locations of the first and second user inputs.

FIG. 10 illustrates a second user input 1004 changing the display value 620 by an incremental or decremental amount based on separation distance between locations of first and second user inputs 1002, 1004 on the touch-sensitive device 124. Optionally, the first and second user inputs 1002, 1004 may be received via touches of the display device 118. The first user input 1002 moves the indicator element in the slider control 306 to change the display value 620 by the first amount based on the distance the indicator element is moved and a scale factor of the computer system 100. For example, moving the indicator element by a distance of 10 mm may change the display value by a first amount of 20 units (e.g., from the value 91 to the value 111). Optionally, moving the indicator element by a distance of 10 mm may change the display value by a first amount of 40 units (e.g., from the value 91 to the value 131). The second user input 1004 may change the display value 620 by an incremental or decremental amount based on a separation distance between a location where the first user input 1002 is received on the touch-sensitive device and a location where the second user input 1004 is received on the touch-sensitive device.

To change the scale factor of the computer system 100, the first user input 1002 may remain stationary on the touch-sensitive device while the second user input 1004 slides closer to or further away from the first user input 1002. For example, the scale factor may be 2 to 1, such that by moving the indicator element 10 mm, the display value changes by 20 units (e.g., from 91 to 111). Moving the second user input 1004 closer to the first user input 1002 (e.g., decreasing the separation distance between the locations of the first and second user inputs 1002, 1004) decreases the scale factor. For example, the second user input may decrease the scale factor to 1 to 1, such that by moving the indicator element 10 mm with the first user input 1002, the display value changes by 10 units (e.g., from 91 to 101). Alternatively, moving the second user input 1004 away from the first user input 1002 (e.g., increasing the separation distance between the locations of the first and second user inputs 1002, 1004 on the touch-sensitive device) increases the scale factor. For example, the second user input 1004 may increase the scale factor to 4 to 1, such that by moving the indicator element 10 mm with the first user input 1002, the display value changes by 40 units (e.g., from 91 to 131).

In one or more embodiments of the subject matter described herein, a method includes displaying a slider control on a display device or a display screen of a touch-sensitive device with a computer system. The slider control is configured to change a display value of one or more components shown on the display device or the display screen responsive to movement of an indicator element in the slider control. The method includes receiving a first user input on the touch-sensitive device of the computer system associated with movement of the indicator element in the slider control, and changing the display value of the one or more components by a first amount based on a distance that the first user input moved the indicator in the slider control. A second user input is received on the touch-sensitive device and changes the display value of the one or more components by a micro-amount. The micro-amount that the display value is changed is smaller than the first amount that the display value is changed.

Optionally, the first user input is sliding a first finger along the touch-sensitive device.

Optionally, the second user input is repeated tapping on the touch-sensitive device. Each tap changes the display value of the one or more components by a unit of a range of the display values.

Optionally, the unit is the smallest increment that the display value can be changed by the computer system.

Optionally, changing the display value by the micro-amount based on the second user input includes changing the display value by a positive amount for each tap on one side of the first user input, and changing the display value by a negative amount for each tap on an opposite side of the first user input.

Optionally, the first and second user inputs includes detecting concurrent touches on the touch-sensitive device by different appendages of a user.

Optionally, detecting concurrent touches includes detecting a first touch on the touch-sensitive device by a first finger of the user and detecting a concurrent second touch on the touch-sensitive device by a second finger of the user.

Optionally, the second user input includes additional concurrent touches on the touch-sensitive device by one or more additional fingers.

Optionally, changing the display value based on the second user input includes changing the display value based on each touch of the one or more additional fingers concurrently touching the touch-sensitive device.

Optionally, the second user input includes sliding a finger along the touch-sensitive device while the first user input remains stationary.

Optionally, the second user input changes the display value by an incremental amount or a decremental amount that is based on separation distance between a location where the first user input is received on the touch-sensitive device and a location where the second user input is received on the touch-sensitive device.

Optionally, the computer system is an ultrasound imaging system and an ultrasound image is configured to be displayed on the display device.

In one or more embodiments of the subject matter described herein, a system includes one or more processors configured to display a slider control on a display device or a display screen of a touch-sensitive device with a computer system. The slider control is configured to change a display value of one or more components shown on the display device or the display screen responsive to movement of an indicator element in the slider control. The system includes a first user input associated with movement of the indicator element in the slider control. The one or more processors are configured to receive the first user input via the touch-sensitive device of the computer system. The display value of the one or more components is configured to change by a first amount based on a distance that the first user input moved the indicator element in the slider control. The system also includes a second user input. The one or more processors are configured to receive the second user input via the touch-sensitive device. The display value of the one or more components is configured to change by a micro-amount based on the second user input. The micro-amount that the display value is changed is smaller than the first amount that the display value is changed.

Optionally, a first finger is configured to slide along the touch-sensitive device as the first user input.

Optionally, the second user input includes repeated tapping on the touch-sensitive device. Each tap changes the display value of the one or more components by a unit of a range of the display values.

Optionally, the unit is the smallest increment that the display value can be changed by the computer system.

Optionally, the second user input is configured to change the display value by the micro-amount by a positive amount for each tap on one side of the first user input, and change the display value by a negative amount for each tap on an opposite side of the first user input.

Optionally, the one or more processors are configured to detect concurrent touches on the touch-sensitive device as the first and second user inputs by different appendages of a user.

Optionally, the one or more processors are configured to detect a first touch on the touch-sensitive device by a first finger of the user and detect a concurrent second touch on the touch-sensitive device by a second finger of the user.

Optionally, the second user input includes additional concurrent touches on the touch-sensitive device by one or more additional fingers.

Optionally, the display value of the one or more components is configured to change based on each touch of the one or more additional fingers concurrently touching the touch-sensitive device.

Optionally, a finger is configured to slide along the touch-sensitive device as the second user input while the first user input remains stationary.

Optionally, the second user input changes the display value by an incremental amount of a decremental amount that is based on separation distance between a location where the first user input is received on the touch-sensitive device and a location where the second user input is received on the touch-sensitive device.

Optionally, the computer system is an ultrasound imaging system, and an ultrasound image is configured to be displayed on the display device.

In one or more embodiments of the subject matter described herein, a method includes displaying a slider control on a display device or a display screen of a touch-sensitive device with an ultrasound imaging system. The slider control is configured to change a display value of one or more components shown on the display device responsive to movement of an indicator element in the slider control. The method includes receiving a first user input on the touch-sensitive device of the ultrasound imaging system associated with movement of the indicator element in the slider control, and changing the display value of the one or more components by a first amount based on a distance that the first user input moved the indicator in the slider control. A second user input is received on the touch-sensitive device and changes the display value of the one or more components by a micro-amount. The micro-amount that the display value is changed is smaller than the first amount that the display value is changed. The first user input is sliding a first finger along the touch-sensitive device, and the second user input is repeating tapping on the touch-sensitive device. Each tap changes the display value of the one or more components by a unit of a range of the display values.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements that do not have that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   displaying a slider control on a display screen of a touch-sensitive device with a computer system, the slider control representing a range having an upper value and a lower value, the slider control configured to change a display value of one or more components shown on the one or more of the display screen or a display device of the computer system responsive to movement of an indicator element in the slider control;
   receiving a first user input on the touch-sensitive device of the computer system, the first user input associated with movement of the indicator element in the slider control;
   changing the display value of the one or more components by a first amount based on a distance that the first user input moved the indicator element in the slider control;
   receiving a second user input on the touch-sensitive device while the first user input is received on the touch-sensitive device, the second user input being received at a location on the slider control within the represented range between the upper value and the lower value of the slider control; and
   changing the display value of the one or more components by a micro-amount based on the second user input, wherein the micro-amount that the display value is changed is smaller than the first amount that the display value is changed.

2. The method of claim 1, wherein the first user input is sliding a first finger along the touch-sensitive device.

3. The method of claim 1, wherein the second user input is repeated tapping on the touch-sensitive device, wherein each tap changes the display value of the one or more components by a unit of a range of the display values.

4. The method of claim 3, wherein the unit is the smallest increment that the display value can be changed by the computer system.

5. The method of claim 3, wherein changing the display value by the micro-amount based on the second user input includes changing the display value by a positive amount for each tap on one side of the first user input, and changing the display value by a negative amount for each tap on an opposite side of the first user input.

6. The method of claim 1, wherein the first and second user inputs includes detecting concurrent touches on the touch-sensitive device by different appendages of a user.

7. The method of claim 6, wherein detecting concurrent touches includes detecting a first touch on the touch-sensitive device by a first finger of the user and detecting a concurrent second touch on the touch-sensitive device by a second finger of the user.

8. The method of claim 7, wherein the second user input includes additional concurrent touches on the touch-sensitive device by one or more additional fingers.

9. The method of claim 8, wherein changing the display value based on the second user input includes changing the display value based on each touch of the one or more additional fingers concurrently touching the touch-sensitive device.

10. The method of claim 1, wherein the second user input includes sliding a finger along the touch-sensitive device while the first user input remains stationary.

11. The method of claim 1, wherein the second user input changes the display value by an incremental amount or a decremental amount that is based on separation distance between a location where the first user input is received on the touch-sensitive device and a location where the second user input is received on the touch-sensitive device.

12. The method of claim 1, further comprising receiving a third user input, wherein the display value of the one or more components is configured to change by a second micro-amount that is less than the micro-amount of the second user input.

13. A system comprising:
   one or more processors of a computer system configured to display a slider control on a display screen of a touch-sensitive device, the slider control representing a range having an upper value and a lower value, the slider control configured to change a display value of one or more components shown on one or more of the display screen or a display device of the computer system responsive to movement of an indicator element in the slider control,
   wherein the one or more processors are configured to receive a first user input associated with movement of the indicator element in the slider control via the touch-sensitive device of the computer system, wherein the display value of one or more components is configured to change by a first amount based on a distance that the first user input moved the indicator element in the slider control, and wherein the one or more processors are configured to receive a second user input via the touch-sensitive device while the first user input is received via the touch-sensitive device, the second user input being received at a location on the slider control within the represented range between the upper value and the lower value of the slider control, wherein the display value of the one or more components is configured to change by a micro-amount based on the second user input, wherein the micro-amount that the display value is changed is smaller than the first amount that the display value is changed.

14. The system of claim 13, wherein a first finger is configured to slide along the touch-sensitive device as the first user input.

15. The system of claim 13, wherein the second user input includes repeated tapping on the touch-sensitive device, wherein each tap changes the display value of the one or more components by a unit of a range of the display values.

16. The system of claim 15, wherein the second user input is configured to change the display value by a positive amount for each tap on one side of the first user input, and change the display value by a negative amount for each tap on an opposite side of the first user input.

17. The system of claim 13, wherein a finger is configured to slide along the touch-sensitive device as the second user input while the first user input remains stationary.

18. The system of claim 13, wherein the second user input changes the display value by an incremental amount or a decremental amount that is based on separation distance between a location where the first user input is received on the touch-sensitive device and a location where the second user input is received on the touch-sensitive device.

19. The system of claim 13, wherein the computer system is an ultrasound imaging system, wherein an ultrasound image is configured to be displayed on the display device.

20. A method comprising:

displaying a slider control on a display screen of a touch-sensitive device with an ultrasound imaging system, the slider control representing a range having an upper value and a lower value, the slider control configured to change a display value of one or more components shown on a display device of the ultrasound imaging system responsive to movement of an indicator element in the slider control;

receiving a first user input on the touch-sensitive device of the ultrasound imaging system, the first user input associated with movement of the indicator element in the slider control;

changing the display value of the one or more components by a first amount based on a distance that the first user input moved the indicator element in the slider control;

receiving a second user input on the touch-sensitive device while the first user input is received on the touch-sensitive device, the second user input being received at a location on the slider control within the represented range between the upper value and the lower value of the slider control; and changing the display value of the one or more components by a micro-amount based on the second user input, wherein the micro-amount that the display value is changed is smaller than the first amount that the display value is changed, wherein the first user input is sliding a first finger along the touch-sensitive device, and wherein the second user input is repeated tapping on the touch-sensitive device, wherein each tap changes the display value of the one or more components by a unit of a range of the display values.

\* \* \* \* \*